(12) United States Patent
Miller et al.

(10) Patent No.: US 12,355,250 B1
(45) Date of Patent: Jul. 8, 2025

(54) COMPUTER-IMPLEMENTED SYSTEM AND METHOD FOR QUANTIFYING INFRASTRUCTURE IMPACTS TO ELECTRICITY GRID GREENHOUSE GAS EMISSIONS

(71) Applicant: Castalune LLC, Reading, MA (US)

(72) Inventors: Robert Miller, Reading, MA (US); Zachary Andrew Power, Arlington, MA (US)

(73) Assignee: Castalune, LLC, Reading, MA (US)

( * ) Notice: Subject to any disclaimer, the term of this patent is extended or adjusted under 35 U.S.C. 154(b) by 798 days.

(21) Appl. No.: 17/685,752

(22) Filed: Mar. 3, 2022

Related U.S. Application Data

(60) Provisional application No. 63/158,423, filed on Mar. 9, 2021.

(51) Int. Cl.
*H02J 3/28* (2006.01)
*G06Q 50/06* (2024.01)
*H02J 3/00* (2006.01)

(52) U.S. Cl.
CPC ............... *H02J 3/28* (2013.01); *H02J 3/003* (2020.01); *G06Q 50/06* (2013.01); *H02J 2203/10* (2020.01); *H02J 2203/20* (2020.01)

(58) Field of Classification Search
CPC .......... H02J 3/28; H02J 3/003; H02J 2203/10; H02J 2203/20; G06Q 50/06
USPC ........................................................ 703/18
See application file for complete search history.

*Primary Examiner* — John E Johansen
(74) *Attorney, Agent, or Firm* — PATENTFILE, LLC; Bradley C. Fach; Steven R. Kick

(57) ABSTRACT

A computer implemented system and method for quantifying and/or optimizing intended greenhouse gas emission offsets to an electrical power grid are provided. Preferably, the method may include the steps of: instantiating, via a processor of a computing platform, a first system stress data point from a generator node with a first time stamp in a database; instantiating, via the processor of the computing platform, a second system stress data point from the generator node with a second time stamp in the database; calculating, via the processor of the computing platform, a differential object, the differential object describing a differential between the first system stress data point and the second system stress data point; and determining, via the processor of the computing platform, an energy supply characteristic object of the generator node based on the differential between the first system stress data point and the second system stress data point.

20 Claims, 7 Drawing Sheets

COMPUTER-IMPLEMENTED SYSTEM AND METHOD FOR QUANTIFYING INFRASTRUCTURE IMPACTS TO ELECTRICITY GRID GREENHOUSE GAS EMISSIONS

CROSS REFERENCE TO RELATED APPLICATIONS

This application claims priority to and the benefit of the filing date of U.S. Provisional Application No. 63/158,423, filed on Mar. 9, 2021, entitled "A SYSTEM AND METHOD FOR QUANTIFYING INFRASTRUCTURE IMPACTS TO ELECTRICITY GRID GREENHOUSE GAS EMISSIONS", which is hereby incorporated by reference in its entirety.

GOVERNMENT SUPPORT CLAUSE

This invention was made with government support under contract DE-AR0001278 awarded by the Department of Energy (DOE). The government has certain rights in the invention.

FIELD OF THE INVENTION

This patent specification relates to the field of mitigating greenhouse gas emissions. More specifically, this patent specification relates to a system and method for quantifying impacts of one or more generator nodes of an electrical power grid to greenhouse gas emissions, such as which may be used for mitigating greenhouse gas emissions.

BACKGROUND

Greenhouse gas emissions are an important factor for decisions around infrastructure planning. Governments and utilities are investing time and resources into decreasing the greenhouse gas emissions of the grid, and many energy consumers are including greenhouse gas emissions into their energy management decisions.

Currently, greenhouse gas emissions are monitored for specific generation facilities based on their equipment, fuel and production. This data is required for various permitting and reporting processes. Renewable energy projects are understood to displace the generation of other-typically thermal-electricity generation technologies in places where generators are dispatched according to marginal cost.

The electricity used by infrastructure, including but not limited to commercial and industrial buildings and electric vehicle charging stations, is sourced from a regional electricity grid consisting of a wide range of electricity generation technologies. Energy users quantify the greenhouse gas emissions resulting from an energy consuming asset when planning their energy management activities. This knowledge informs decisions around increases, decreases, or shifts in energy usage through both operational and contractual activities as well as capital investments in infrastructure. Low-emission energy producers seek to develop projects able to displace the largest amounts of emissions from other grid infrastructure assets.

However, the ability to quantify how much and what type of greenhouse gases are displaced, or offset, by renewable energy generating facilities and energy-consuming activity is not yet defined. Specifically, there is not a system for measuring increases or decreases in the forward-looking greenhouse gas emissions of a planned generation facility or energy-consuming facility. Additionally, there is not a system for measuring the actual greenhouse gas emissions offset (or increased) associated with existing generation facilities or end-use facilities. Furthermore, current power grid systems lack the ability to identify and provide a true match of offset. Currently, the offset can occur at any time, e.g., daytime generation is offset with nighttime generation, and current offset is provided at a daily/monthly/yearly level. This is useful to start, but ignores the fact that at some point it is needed to provide a true offset of carbon emissions, such as by offsetting daytime usage with daytime availability, e.g., the sun does not shine at night but there is still demand for electricity and that by building enough solar to satisfy 100% of demand (both day and night) does no good if the solar generated power cannot be used at night.

Therefore, a need exists for novel systems and methods that are able to quantify impacts of generator nodes to electricity grid greenhouse gas emissions.

BRIEF SUMMARY OF THE INVENTION

A computer implemented system and method for quantifying infrastructure impacts to electricity grid greenhouse gas emissions which may be used for determining energy supply characteristics of a generator node of an electrical power grid and for providing the true offset of carbon emissions are provided. The system and method preferably may be used to quantify impacts of generator nodes (existing and planned) to electricity grid greenhouse gas emissions. In some embodiments, the system and method may be used to optimize for true carbon offset (offset at the sub-hourly, hourly, two hour time period) at a portfolio level by determining one or more energy supply characteristic objects which describe the carbon localized/nodal carbon intensity of one or more generator nodes of a power grid. Some simple cases can be understood by network diagrams (production at the end of a single line). However, power grids are generally more complicated than having a single power transmission line. Power flow studies are often processing intensive, time consuming, and delayed or incomplete due to hard to access data. The system and method of the present invention is able to decrease the processing and data storage requirements for determining one or more energy supply characteristic objects as compared to existing systems and methods.

According to one embodiment consistent with the principles of the invention, a computer implemented method for quantifying infrastructure impacts to electricity grid greenhouse gas emissions is provided. In some embodiments, the method may include the steps of: instantiating, via a processor of a computing platform, a first system stress data point from a generator node with a first time stamp in a database; instantiating, via the processor of the computing platform, a second system stress data point from the generator node with a second time stamp in the database; calculating, via the processor of the computing platform, a differential object, the differential object describing a differential between the first system stress data point and the second system stress data point; and determining, via the processor of the computing platform, an energy supply characteristic object of the generator node based on the differential between the first system stress data point and the second system stress data point.

In further embodiments, a computer implemented method for quantifying infrastructure impacts to electricity grid greenhouse gas emissions may include the steps of: instantiating, via a processor of a computing platform, a first system stress data point from a generator node with a first time stamp in a database; instantiating, via the processor of the computing platform, a second system stress data point from the generator node with a second time stamp in the database; calculating, via the processor of the computing platform, a differential object, the differential object describing a differential between the first system stress data point and the second system stress data point; instantiating, via the processor of the computing platform, a weather data object describing weather data of the generator node during a time period between the first time stamp and the second time stamp in the database; and determining, via the processor of the computing platform, an energy supply characteristic object of the generator node based on the weather data object and the differential object between the first system stress data point and the second system stress data point, wherein the energy supply characteristic object of the generator node is determined to have a relatively greater carbon offset ability if the differential object between the first system stress data point and the second system stress data point does not exceed a differential threshold, wherein the energy supply characteristic object of the generator node is determined to have a relatively lesser carbon offset ability if the differential object between the first system stress data point and the second system stress data point exceeds the differential threshold.

Numerous objects, features and advantages of the present invention will be readily apparent to those of ordinary skill in the art. Some example objects of the present invention are listed below.

One object of the present invention is to provide a system and method which may utilize hourly, sub-hourly, or any other time period, nodal prices to determine supply demand characteristics of one or more generator nodes of a power grid. As an example, and ignoring times of unusual required load, for a weather-based generation node, such as a wind turbine generation facilities and solar generation facilities, the system may calculate a supply demand characteristics that describes a "potential carbon offset score" of node that is already influenced by weather/renewable generation, e.g., if prices move related to weather events (prices at node go up/down when wind is low, for solar cloudy, or night) and/or if price characteristic change related to weather (prices become more/less variable when wind goes up).

Another object of the present invention is to provide a system and method which may be configured to create similar carbon offset score for an entire power grid or aggregations of two or more nodes (hubs or zones).

Another object of the present invention is to provide a system and method which may use relation between nodal potential carbon offset score and the grid/aggregated node carbon offset score to convert the nodal potential carbon offset score to a percentage of hourly, sub-hourly, or other time period, carbon offset for new generation asset.

Another object of the present invention is to provide a system and method which may apply trends in weather, load, and renewable generation (including events) to calculate future offset amounts and duration.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

Figure 1:
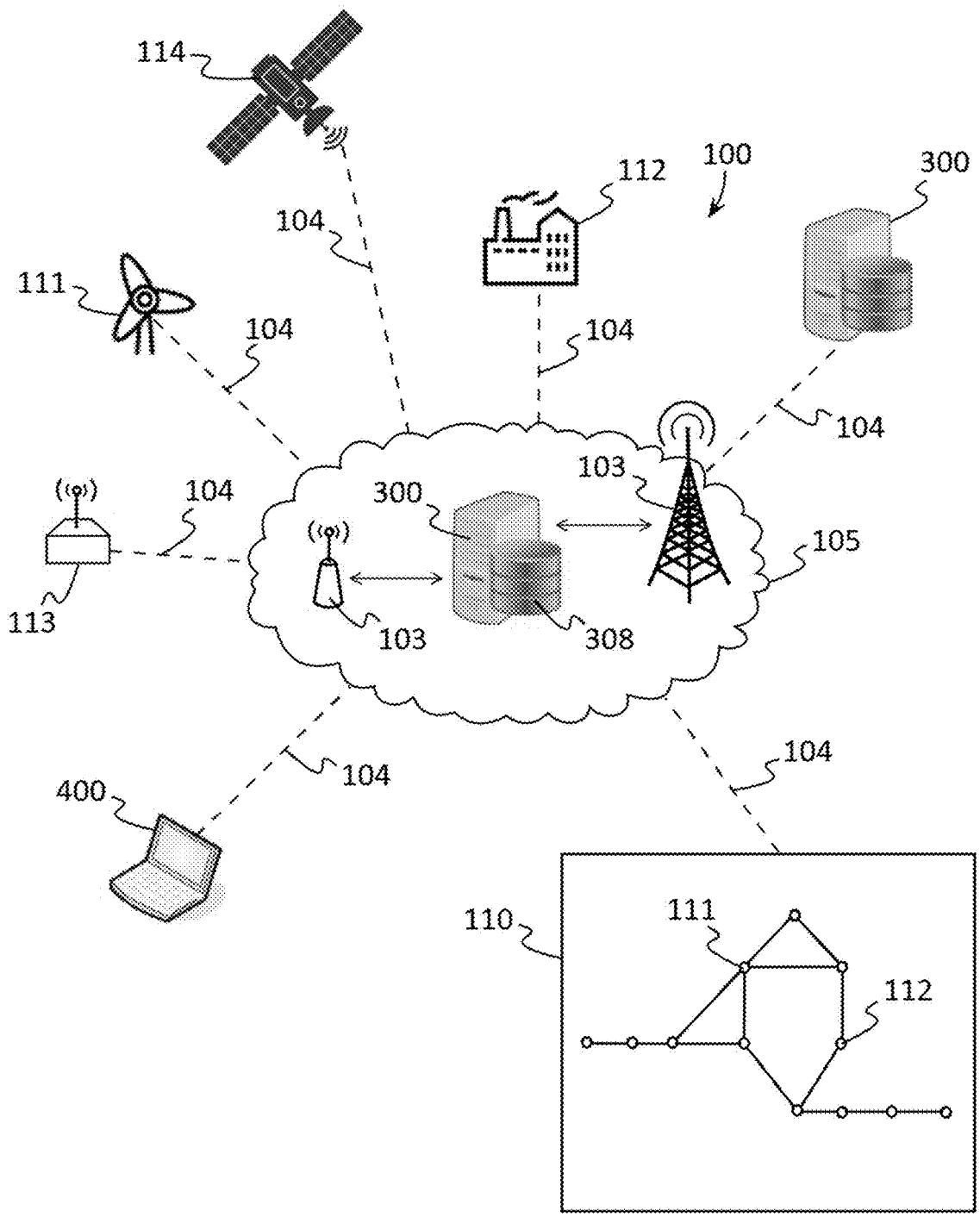
FIG. 1 depicts an illustrative example of some of the components and computer implemented methods which may be found in a system for quantifying infrastructure impacts to electricity grid greenhouse gas emissions according to various embodiments described herein.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Although the terms "first", "second", etc. are used herein to describe various elements, these elements should not be limited by these terms. These terms are only used to distinguish one element from another element. For example, the first element may be designated as the second element, and the second element may be likewise designated as the first element without departing from the scope of the invention.

As used in this application, the term "about" or "approximately" refers to a range of values within plus or minus 10% of the specified number. Additionally, as used in this application, the term "substantially" means that the actual value is within about 10% of the actual desired value, particularly within about 5% of the actual desired value and especially within about 1% of the actual desired value of any variable, element or limit set forth herein.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

Definitions

As used herein, the terms "computer" and "computing device" refer to a machine, apparatus, or device that is capable of accepting and performing logic operations from software code. The term "application", "software", "software code", "source code", "script", or "computer software" refers to any set of instructions operable to cause a computer to perform an operation. Software code may be operated on by a "rules engine" or processor. Thus, the methods and systems of the present invention may be performed by a computer or computing device having a processor based on instructions received by computer applications and software, with servers and client devices comprising exemplary computing devices.

The term "client device" as used herein is a type of computer or computing device comprising circuitry and configured to generally perform functions such as recording audio, photos, and videos; displaying or reproducing audio, photos, and videos; storing, retrieving, or manipulation of electronic data; providing electrical communications and network connectivity; or any other similar function. Non-limiting examples of client devices include: personal computers (PCs), workstations, servers, laptops, tablet PCs including the iPad, cell phones including iOS phones made by Apple Inc., Android OS phones, Microsoft OS phones, Blackberry phones, Apple iPads, Anota digital pens, digital music players, or any electronic device capable of running computer software and displaying information to a user, memory cards, other memory storage devices, digital cameras, external battery packs, external charging devices, and the like. Certain types of electronic devices which are portable and easily carried by a person from one location to another may sometimes be referred to as a "portable electronic device" or "portable device". Some non-limiting examples of portable devices include: cell phones, smartphones, tablet computers, laptop computers, tablets, digital pens, wearable computers such as Apple Watch, other smartwatches, Fitbit, other wearable fitness trackers, Google Glasses, and the like.

The term "computer readable medium" as used herein refers to any medium that participates in providing instructions to the processor for execution. A computer readable medium may take many forms, including but not limited to, non-volatile media, volatile media, and transmission media. Non-volatile media includes, for example, optical, magnetic disks, and magneto-optical disks, such as the hard disk or the removable media drive. Volatile media includes dynamic memory, such as the main memory. Transmission media includes coaxial cables, copper wire and fiber optics, including the wires that make up the bus. Transmission media may also take the form of acoustic or light waves, such as those generated during radio wave and infrared data communications.

As used herein the term "data network" or "network" shall mean an infrastructure capable of connecting two or more computers such as client devices either using wires or wirelessly allowing them to transmit and receive data. Non-limiting examples of data networks may include the internet or wireless networks or (i.e., a "wireless network") which may include Wi-Fi and cellular networks. For example, a network may include a local area network (LAN), a wide area network (WAN) (e.g., the Internet), a mobile relay network, a metropolitan area network (MAN), an ad hoc network, a telephone network (e.g., a Public Switched Telephone Network (PSTN)), a cellular network, a Zigbee network, or a voice-over-IP (VOIP) network.

As used herein, the term "database" shall generally mean a digital collection of data or information. The present invention uses novel methods and processes to store, link, and modify information such digital images and videos and user profile information. For the purposes of the present disclosure, a database may be stored on a remote server and accessed by a client device through the internet (i.e., the database is in the cloud) or alternatively in some embodiments the database may be stored on the client device or remote computer itself (i.e., local storage). A "data store" as used herein may contain or comprise a database (i.e., information and data from a database may be recorded into a medium on a data store).

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

New computer-implemented systems and methods for quantifying infrastructure impacts to electricity grid greenhouse gas emissions are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

The present invention will now be described by example and through referencing the appended figures representing preferred and alternative embodiments. As perhaps best shown by FIG. 1, an illustrative example of some of the physical components which may comprise a system for quantifying infrastructure impacts to electricity grid greenhouse gas emissions ("the system") 100 according to some embodiments is presented. The system 100 is configured to facilitate the transfer of data and information between one or more access points 103, client devices 400, and servers 300 over a data network 105. Client devices 400 and servers 300 may send data to and receive data from the data network 105 through a network connection 104 with an access point 103. The system 100 may include or be in electronic communication with one or more power grids 110, generator nodes 111, 112, terrestrial weather sensors 113, and/or non-terrestrial weather sensors 114 via network connections 104. A data store 308 accessible by the server 300 may contain one or more databases 120. The data may comprise any information describing one or more power grids 110, generator nodes 111, 112, terrestrial weather sensors 113, and/or non-terrestrial weather sensors 114, such as nodal/aggregate geographic locations, nodal/aggregate network locations, nodal value of power data, aggregate value of power data, power flows, nodal supply, nodal supply type (wind, solar, natural gas, nuclear, coal, hydroelectric, etc.), nodal load, system generation resource mix (how much solar power is or can be generated in a power grid 110, how much wind power is or can be generated in a power grid 110, etc.,), hourly, sub-hourly, or any other time period, grid capacity, hourly, sub-hourly, or any other time period, grid residual capacity, load forecasts, generation forecasts, etc. These inputs can be retrieved by the system 100 at a daily, weekly, monthly, or other time period cycle as real-time ingestion of data is not required. In this manner, the system 100 is able to determine and provide a true offset of carbon emissions, such as by offsetting daytime usage with daytime availability, e.g., the sun does not shine at night but there is still demand for electricity and that by building enough solar to satisfy 100% of demand (both day and night) does no good if the solar generated power cannot be used at night.

In this example, the system 100 comprises at least one client device 400 (but preferably more than two client devices 400) configured to be operated by one or more users. Client devices 400 may include mobile devices, such as laptops, tablet computers, personal digital assistants, smart phones, and the like, that are equipped with a wireless network interface capable of sending data to one or more servers 300 with access to one or more data stores 308 over a network 105 such as a wireless local area network (WLAN). Additionally, client devices 400 may include fixed devices, such as desktops, workstations, and the like, that are equipped with a wireless or wired network interface capable of sending data to one or more servers 300 with access to one or more data stores 308 over a wireless or wired local area network 105. The present invention may be implemented on at least one computing device, such as a client device 400 and/or server 300, programmed to perform one or more of the steps described herein. In some embodiments, more than one client device 400 and/or server 300 may be used, with each being programmed to carry out one or more steps of a method or process described herein.

Figure 6:
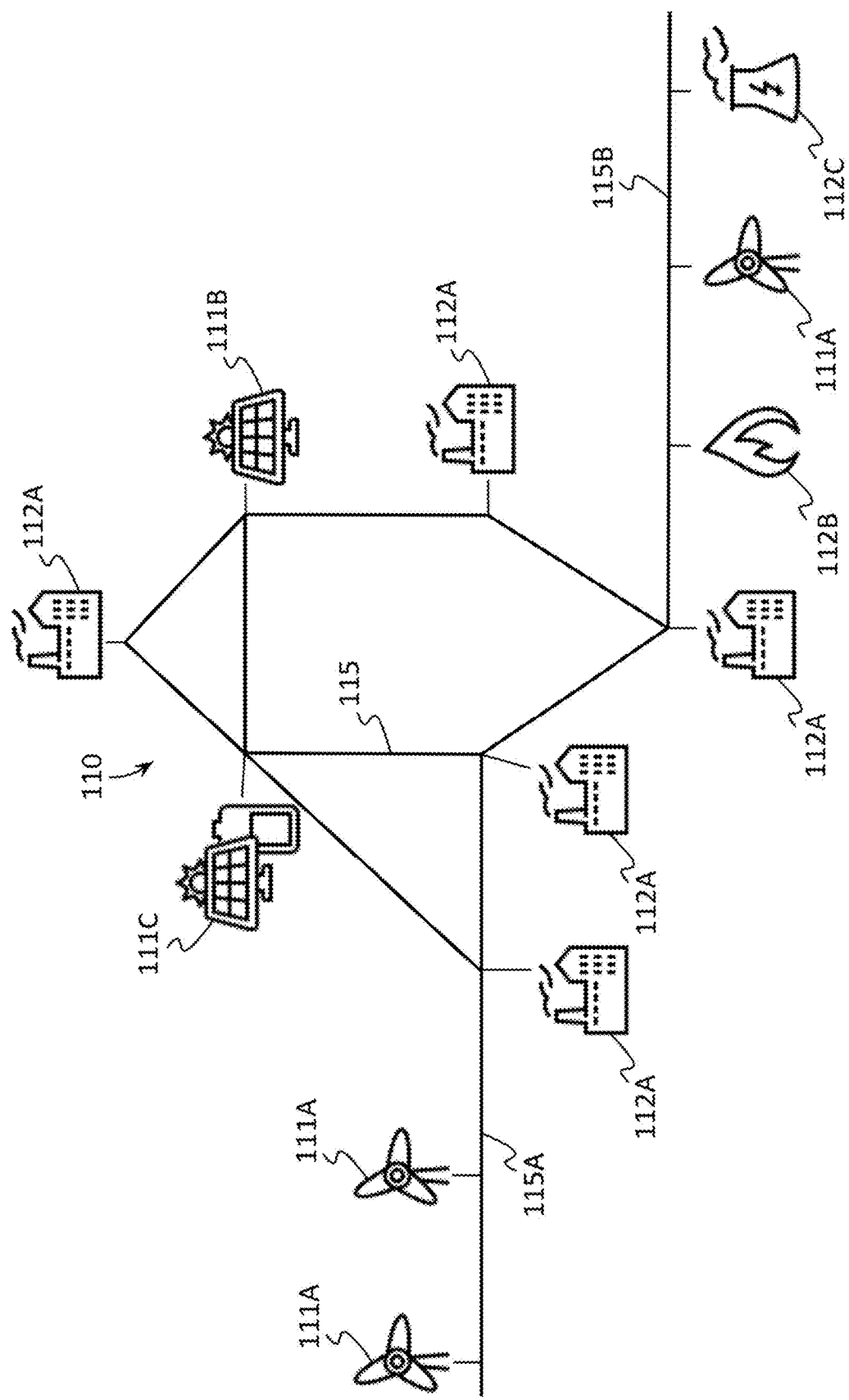
FIG. 6 shows a block diagram illustrating an example of a power grid according to various embodiments described herein.

The system 100 may comprise or may be in electronic communication with one or more power grids 110 and/or one or more generator nodes 111, 112, as shown in FIG. 6. A power grid 110 is an interconnected network for electricity delivery from producers (generator nodes 111, 112) to consumers. Electrical power grids 110 vary in size and can cover whole countries or continents. Generator nodes 111, 112, produce electrical power and provide or sell the power to an electrical grid 110. Generator nodes 111, 112, may include renewable energy power generator nodes 111, such as wind turbine generation facilities 111A, solar generation facilities 111B, solar generation facilities with battery or other storage capacity 111C, hydroelectric generation facilities, etc., and generator nodes 111, 112, may include non-renewable energy power generator nodes 112, such as coal burning generation facilities 112A, natural gas burning generation facilities 112B, other fossil fuel combustion generation facilities, nuclear generation facilities 112C, etc. Generator nodes 111, 112, of a power grid 110 may be connected to the power grid 110 via power transmission lines 115, 115A, 115B, which typically have transmission constraints limiting their transmission capacity.

The system 100 may comprise or may be in electronic communication with one or more weather sensors, such as one or more terrestrial weather sensors 113 and non-terrestrial weather sensors 114. Terrestrial weather sensors 113 may comprise weather sensors that are based on or proximate to the surface of the earth, such as by being placed on or located at towers, buildings, generator nodes 111, 112, airports, schools, other public weather stations, private weather stations, weather balloons, drones, weather reporting aircraft, etc. Terrestrial weather sensors 113 may include anemometers, ultrasonic wind sensors, radar stations, solar panels, solar cells for determining solar light intensity, water level sensors, wave height sensors, atmospheric transmittance/opacity sensors, temperature sensors, pressure sensors, precipitation sensors (snow, rain, etc.), and any other earth-based sensor or reporting device or method for reporting weather conditions. Non-terrestrial weather sensors 114 may comprise weather sensors that are not based on or proximate to the surface of the earth, such as by being placed on or located on satellites, space stations, and other earth orbiting objects. Non-terrestrial weather sensors 114 may include laser based sensors that measure wind speeds, optical sensors that measure cloud cover, radiometers, such as Advanced Very High Resolution Radiometers (AVHRR), which may be configured as visible sensors (typically within a wavelength band between 0.55 and 0.99 micrometers, or within the visible atmospheric window), infrared sensors (respond to the upwelling infrared radiation emitted by clouds, the earth's surface and the atmosphere), water vapor sensors (measures infrared radiation near the 6.7 μm water vapor absorption band), and microwave sensors (senses the microwave (far infrared) radiation emitted by the earth with wavelengths in the vicinity of 1.5 cm).

In some embodiments, the system 100 may be configured to facilitate the communication of information to and from one or more power grids 110, generator nodes 111, 112, terrestrial weather sensors 113, and/or non-terrestrial weather sensors 114 with one or more client devices 400 and servers 300 of the system 100. In some embodiments, this information may be used by the system 100 for determining energy supply characteristics of one or more generator nodes 111, 112, of an electrical power grid 110. In further embodiments, this information may be used by the system 100 for correlating power grid 110 stress to weather events, (expected or unexpected) to determine dependance of power grid 110 stress events on weather conditions. In further embodiments, this information may be used by the system 100 for enabling sustainable carbon offset by determining a non-renewable support cost which may be provided to non-renewable energy generator nodes which may allow the non-renewable energy generator nodes to remain available to a power grid 110 during weather conditions that are adverse to renewable energy generator nodes so that the power grid 110 can meet power demands when one or more renewable energy resources (e.g., wind, sun, etc.) are unavailable or are available at a reduced level.

In some embodiments, the system 100 may be used to optimize for carbon offset at a portfolio level by determining one or more energy supply characteristic objects 125, 125A, 125B, which describe the carbon localized/nodal carbon intensity of one or more nodes 111, 112, of a power grid 110. Some simple cases can be understood by network diagrams (production at the end of a single line). However, power grids 110 are generally more complicated than having a single power transmission line 115, 115A, 115B, as shown in FIG. 6. Power flow studies are often processing and data storage intensive, time consuming, and delayed or incomplete due to hard to access data. In preferred embodiments, the system 100 may utilize hourly, sub-hourly, or any other time period, nodal prices to determine supply demand characteristics 125, 125A, 125B. As an example, and ignoring times of unusual required load, for a weather-based generation node 111, such as a wind turbine generation facilities 111A and solar generation facilities 111B, the system 100 may calculate or determine a supply demand characteristic object 125, 125A, 125B, that describes a "potential carbon offset score" of node 111, 112, that is already influenced by weather/renewable generation, e.g., if prices move related to weather events (prices at node go up/down when wind is low, for solar cloudy, or night) and/or if price characteristic change related to weather (prices become more/less variable when wind goes up). If no impact based on weather events, then the system 100 may determine that a supply demand characteristic object 125, 125A, 125B, of the node 111, 112, does not have weather correlation and is likely to have greater carbon offset ability (high carbon offset score). If impact based on weather events, then the system 100 may determine that a supply demand characteristic object 125, 125A, 125B, of the node 111, 112, does have weather correlation and is likely to have lesser carbon offset ability (low carbon offset score). They system 100 may also be configured to create similar carbon offset score for an entire power grid 110 or aggregations of two or more nodes (hubs or zones) 111, 112. In further embodiments, the system 100 may use relation between nodal potential carbon offset score and the grid 110/aggregated node 111, 112, carbon offset score to determine supply demand characteristic objects 125, 125A, 125B, which describe the nodal potential carbon offset score to a percentage of hourly, sub-hourly, or any other time period, carbon offset for new generation asset. In further embodiments, the system 100 may apply trends in weather, load, and renewable generation (including events) to calculate or determine supply demand characteristic objects 125, 125A, 125B, which describe future carbon offset amounts and duration.

Figure 2:
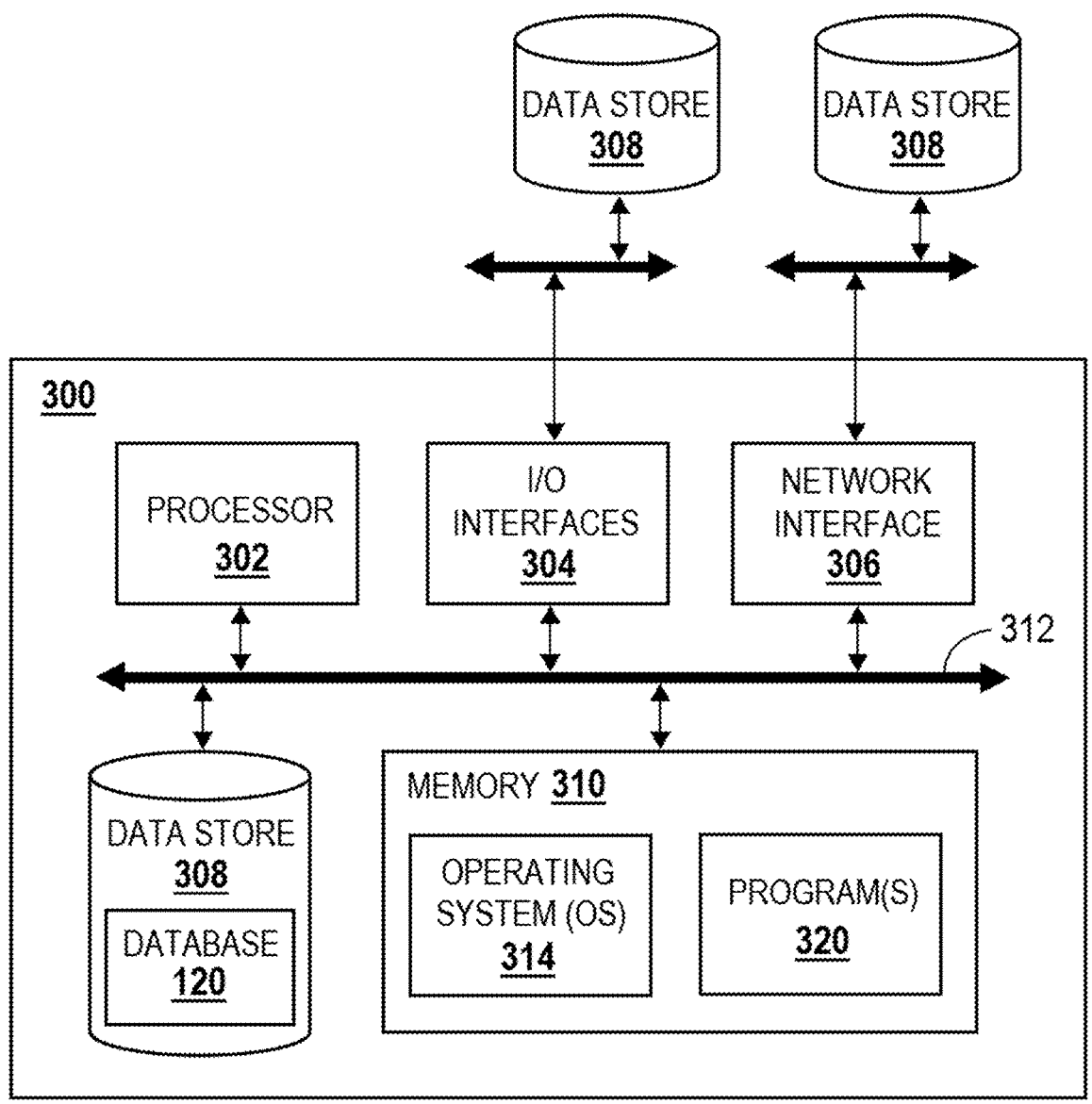
FIG. 2 illustrates a block diagram showing an example of a server which may be used by the system as described in various embodiments herein.

Referring now to FIG. 2, in an exemplary embodiment, a block diagram illustrates a server 300 of which one or more may be used in the system 100 or standalone and which may be a type of computing platform. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 2 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate on a network, such as the Internet, the data network 105, the enterprise, and the like, etc. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data.

The data store 308 is a type of memory and may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 308 may be located internal to the server 300 such as, for example, an internal hard drive connected to the local interface 312 in the server 300. Additionally, in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 may include a suitable operating system (O/S) 314 and one or more programs 320.

The operating system 314 essentially controls the execution of other computer programs, such as the one or more programs 320, and provides scheduling, input-output control, file and data management, memory management, and communication control and related services. The operating system 314 may be, for example Windows NT, Windows 2000, Windows XP, Windows Vista, Windows 7, Windows 8, Windows 10, Windows Server 2003/2008/2012/2016 (all available from Microsoft, Corp. of Redmond, WA), Solaris (available from Sun Microsystems, Inc. of Palo Alto, CA), LINUX (or another UNIX variant) (available from Red Hat of Raleigh, NC and various other vendors), Android and variants thereof (available from Google, Inc. of Mountain View, CA), Apple OS X and variants thereof (available from Apple, Inc. of Cupertino, CA), or the like.

The one or more programs 320, may be configured to implement the various processes, algorithms, methods, techniques, etc. described herein.

Figure 3:
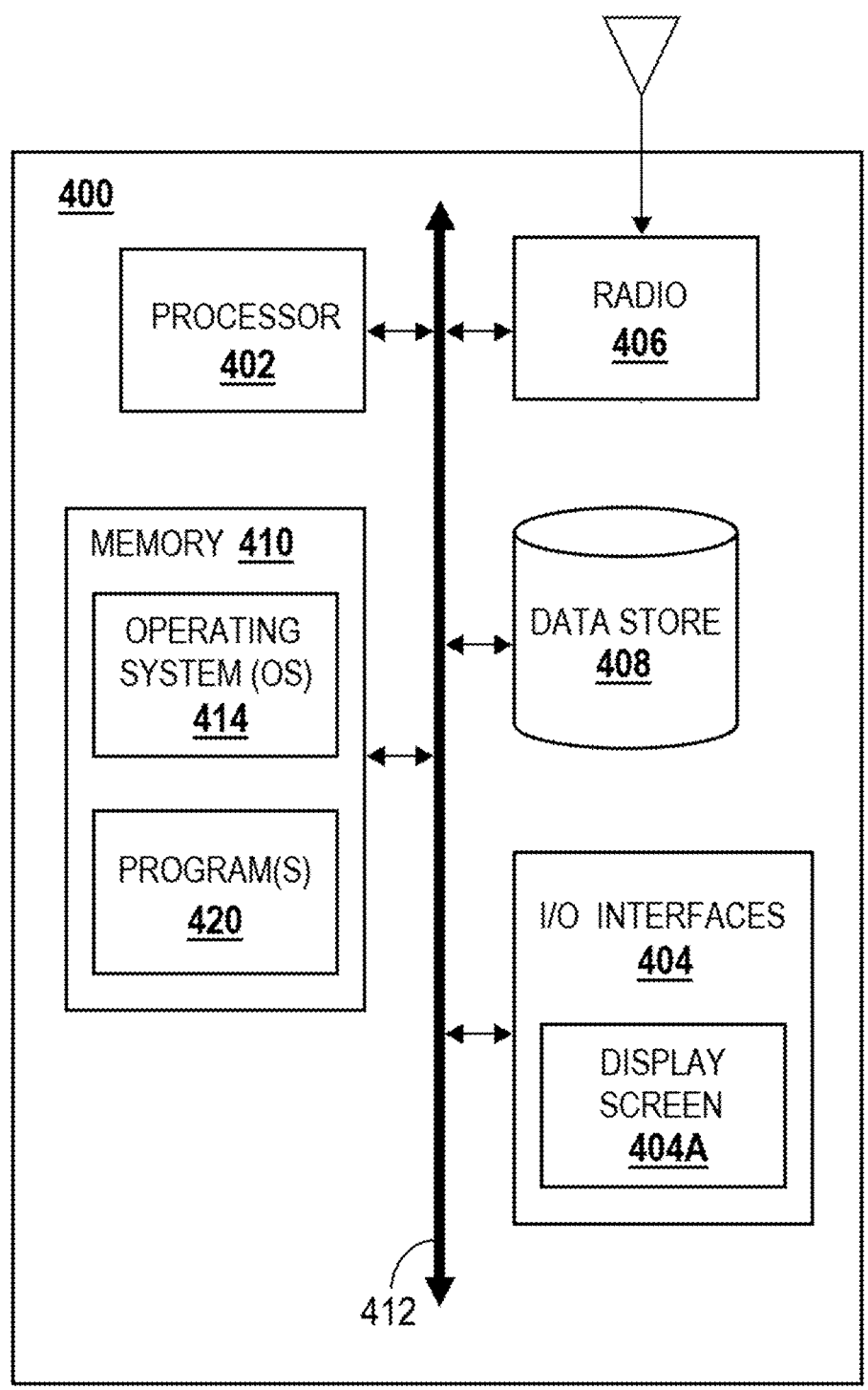
FIG. 3 shows a block diagram illustrating an example of a client device which may be used by the system as described in various embodiments herein.

Referring to FIG. 3, in an exemplary embodiment, a block diagram illustrates a client device 400 of which one or more may be used in the system 100 or the like and which may be a type of computing platform. The client device 400 can be a digital device that, in terms of hardware architecture, generally includes a processor 402, input/output (I/O) interfaces 404, a radio 406, a data store 408, and memory 410. It should be appreciated by those of ordinary skill in the art that FIG. 3 depicts the client device 400 in an oversimplified manner, and a practical embodiment may include additional components and suitably configured processing logic to support known or conventional operating features that are not described in detail herein. The components (402, 404, 406, 408, and 410) are communicatively coupled via a local interface 412. The local interface 412 can be, for example but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the client device 400, a semiconductor-based microprocessor (in the form of a microchip or chip set), or generally any device for executing software instructions. When the client device 400 is in operation, the processor 402 is configured to execute software stored within the memory 410, to communicate data to and from the memory 410, and to generally control operations of the client device 400 pursuant to the software instructions. In an exemplary embodiment, the processor 402 may include a mobile optimized processor such as optimized for power consumption and mobile applications.

The I/O interfaces 404 can be used to receive data and user input and/or for providing system output. User input can be provided via a plurality of I/O interfaces 404, such as a keypad, a touch screen, a camera, a microphone, a scroll ball, a scroll bar, buttons, bar code scanner, voice recognition, eye gesture, and the like. System output can be provided via a display screen 404A, such as a liquid crystal display (LCD), light emitting diode (LED) display, touch screen display, and the like. The I/O interfaces 404 can also include, for example, a global positioning service (GPS) radio, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the client device 400. Additionally, the I/O interfaces 404 may be used to output notifications to a user and can include a speaker or other sound emitting device configured to emit audio notifications, a vibrational device configured to vibrate, shake, or produce any other series of rapid and repeated movements to produce haptic notifications, and/or a light emitting diode (LED) or other light emitting element which may be configured to illuminate to provide a visual notification.

The radio 406 enables wireless communication to an external access device or network. Any number of suitable wireless data communication protocols, techniques, or methodologies can be supported by the radio 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication.

The data store 408 may be used to store data and is therefore a type of memory. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs 420, each of which includes an ordered listing of executable instructions for implementing logical functions. In the example of FIG. 3, the software in the memory system 410 includes a suitable operating system (O/S) 414 and programs 420.

The operating system 414 essentially controls the execution of other computer programs, and provides scheduling, input-output control, file and data management, memory management, and communication control and related services. The operating system 414 may be, for example, LINUX (or another UNIX variant), Android (available from Google), Symbian OS, Microsoft Windows CE, Microsoft Windows 7 Mobile, Microsoft Windows 10, iOS (available from Apple, Inc.), webOS (available from Hewlett Packard), Blackberry OS (Available from Research in Motion), and the like.

The programs 420 may include various applications, add-ons, etc. configured to provide end user functionality with the client device 400. For example, exemplary programs 420 may include, but not limited to, a web browser, social networking applications, streaming media applications, games, mapping and location applications, electronic mail applications, financial applications, and the like. In a typical example, the end user typically uses one or more of the programs 420 along with a network 105 to manipulate information of the system 100.

Figure 4:
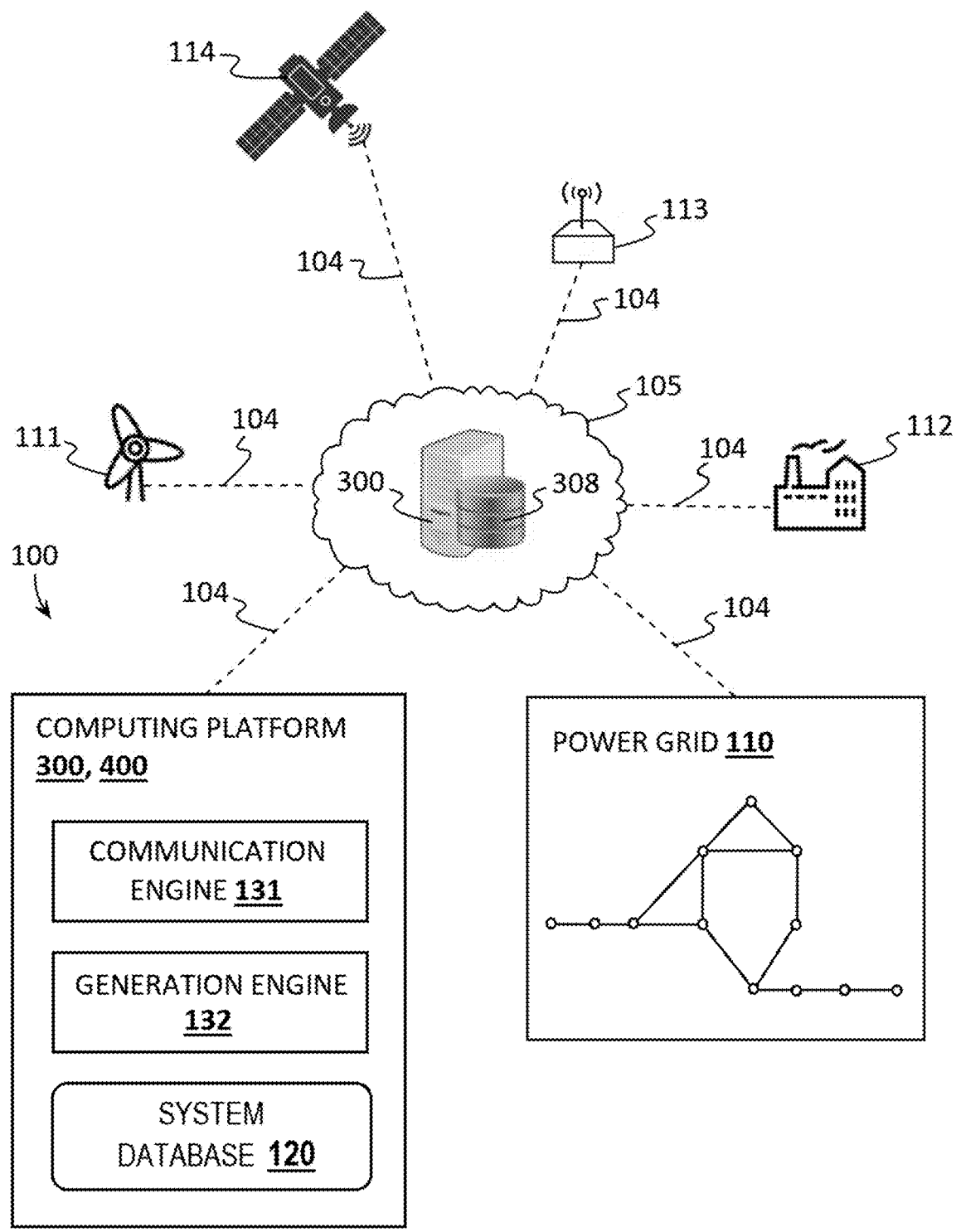
FIG. 4 depicts a block diagram illustrating some applications of a system for quantifying infrastructure impacts to electricity grid greenhouse gas emissions which may function as software rules engines according to various embodiments described herein.

Referring now to FIG. 4 a block diagram showing some software rules engines and components which may be found in a system 100 and which may optionally be configured to run on one or more computing platforms, such as servers 300 and/or client devices 400, according to various embodiments described herein are illustrated. A server 300 and client device 400 may be in wired and/or wireless electronic communication through a network 105 with one or more power grids 110, generator nodes 111, 112, terrestrial weather sensors 113, and/or non-terrestrial weather sensors 114. The engines 131, 132, may be in electronic communication so that data may be readily exchanged between the engines 131, 132, and one or more engines 131, 132, may read, write, or otherwise access data in one or more databases 120 of one or more data stores 308.

In some embodiments, the system 100 may comprise one or more software rules engines or programs, such as one or more communication engines 131 and one or more generation engines 132. In some embodiments, a communication engine 131 and a generation engine 132 may be operated on a single computing platform, such as a single server 300 or a single client device 400. In further embodiments, the system 100 may comprise any number of communication engines 131 and generation engines 132 which may be run on any number of computing platforms, such as any number of servers 300 and/or client devices 400. It should be understood that the functions attributed to the engines 131, 132, described herein are exemplary in nature, and that in alternative embodiments, any function attributed to any engine 131, 132, may be performed by one or more other engines 131, 132, or any other suitable processor logic.

Figure 5:
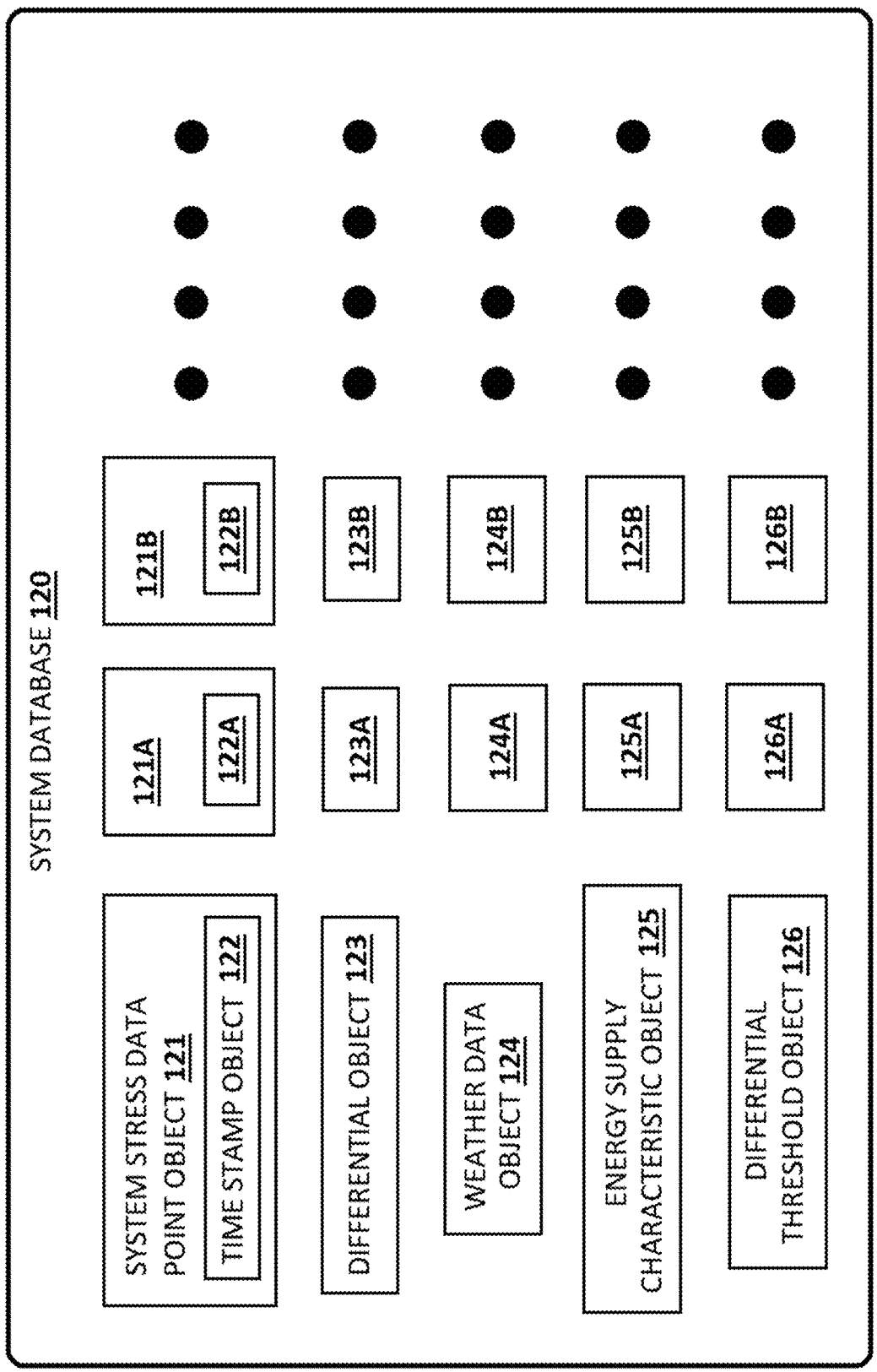
FIG. 5 illustrates a block diagram illustrating an example of a system database according to various embodiments described herein.

The system 100 may comprise one or more databases, such as a system database 120, which may be stored on a data store 308 accessible to one or more engines 131, 132. It should be understood that the described structure of the system database 120 (FIG. 5) is exemplary in nature, and that in alternative embodiments, the data contained within the system database 120 may be organized in any other way.

In preferred embodiments, a system database 120 may comprise one or more, such as a plurality of, system stress data point objects, such as a first system stress data point object 121, a second system stress data point object 121A, a third system stress data point object 121B, etc. A system stress data point object 121, 121A, 121B, may comprise data describing a supply/demand imbalance in a power grid 110, either at a nodal 111, 112, or network 110 level, such as: price spikes (up or down) in the value of power paid to a node 111, 112; price volatility changes in the value of power paid to a node 111, 112; increased frequency, or increased magnitude of price changes over a range of time (e.g., hourly, sub-hourly, or any other time period, such as <2 days and >15 mins); system power flows of the power grid 110; power grid 110 system published load (aggregate/network and nodal); power grid 110 system published generation (total and by generation types e.g., wind, solar, coal, renewable, non-renewable, etc.); power grid 110 system published generation (aggregate of two or more nodes 111, 112, network or power grid 110 as a whole, and nodal 111, 112); and power grid 110 system published capacity and residual capacity (e.g., total by generation types, aggregate/network, and nodal).

In preferred embodiments, a system database 120 may comprise one or more, such as a plurality of, time stamp objects, such as a first time stamp object 122, a second time stamp object 122A, a third time stamp object 122B, etc. Each system stress data point object 121, 121A, 121B, may comprise or may be associated with a time stamp object 122, 122A, 122B. A time stamp object 122, 122A, 122B, may comprise data describing the time that the data of a system stress data point object 121, 121A, 121B, was generated. For example, a time stamp object 122, 122A, 122B, may describe the date and time of day that a price spike (up or down) in the value of power paid to a node 111, 112, was recorded.

In preferred embodiments, a system database 120 may comprise one or more, such as a plurality of, differential objects, such as a first differential object 123, a second differential object 123A, a third differential object 123B, etc. A differential object 123, 123A, 123B, may comprise data describing a difference, change in standard deviation, or other measure of, showing, or indicator of a differing or varying between two or more system stress data point objects 121, 121A, 121B. For example, a differential object 123, 123A, 123B, may describe the change in the value of power paid to a node 111, 112, at two different times.

In preferred embodiments, a system database 120 may comprise one or more, such as a plurality of, weather data objects, such as a first weather data object 124, a second weather data object 124A, a third energy weather data object 124B, etc. A weather data object 124, 124A, 124B, may comprise data describing one or more weather parameters experienced by a node 111, 112, and aggregation of nodes 111, 112, a power grid 110, etc., on a particular date and time or over a time period so that the weather data objects 124, 124A, 124B, may optionally be correlated to one or more system stress data point objects 121, 121A, 121B, via their respective time stamp objects 122, 122A, 122B. As an example, a weather data object 124, 124A, 124B, may comprise data describing the average wind speed at a node 111, 112 at a particular time or over a particular time period.

In some embodiments, a weather data object 124, 124A, 124B, may comprise data describing weather parameters measured at or proximate to one or more nodes 111, 112, such as: winds speed, wind duration, solar intensity and duration, temperature, barometric pressure, cloud cover, precipitation type and amounts, etc. In further embodiments, a weather data object 124, 124A, 124B, may comprise data describing unexpected weather parameters, such as: weather forecast discrepancies as weather forecasts typically are >1 hour and <7 days e.g., forecast says X should occur, but Y actually happens. Examples of weather or forecast discrepancies include, forecasted to be sunny and it is cloudy, forecasted to be cloudy and it is sunny, forecasted to be windy and it is calm, and forecasted to rain and it is dry. These events could also be duration based, such as it is forecasted to be windy for four consecutive hours and it is windy for two hours then not windy for an hour then windy again. Trends in the accuracy of forecasts may be used to determine energy supply characteristics 125, 125A, 125B, as multiple missed forecasts are more stress inducing to renewable energy power generator nodes 111 than one missed forecast.

In further embodiments, a weather data object 124, 124A, 124B, may comprise data describing expected major weather events, such as hurricanes, tornados, blizzards, etc. With these events there is a forecast that is correct, but it is high impact with lots of downstream impact. Trends in the frequency of expected major weather events may be used to determine energy supply characteristics 125, 125A, 125B, as more hurricanes, for example, might cause more stress on power grid 110 compared to just one event.

In preferred embodiments, a system database 120 may comprise one or more, such as a plurality of, energy supply characteristic objects, such as a first energy supply characteristic object 125, a second energy supply characteristic object 125A, a third energy supply characteristic object 125B, etc.

In some embodiments, an energy supply characteristic object 125, 125A, 125B, may comprise data describing the amount of supply and demand imbalance (sometimes called stress) in the power supply of a node 111, 112, of an aggregate of two or more nodes 111, 112, or of the network or power grid 110 as a whole based on one or more differential objects 123, 123A, 123B, preferably over a time period described by the time stamp objects 122, 122A, 122B, of the two or more system stress data point objects 121, 121A, 121B, used to generate the one or more differential objects 123, 123A, 123B. For example, the energy supply characteristic object 125, 125A, 125B, for a relatively smaller differential object 123, 123A, 123B, generated from two or more system stress data point objects 121, 121A, 121B, for a particular node 111, 112, may comprise data describing that the particular node 111, 112, has a relatively larger ability for offsetting carbon emissions versus a node 111, 112, having a relatively larger differential object 123, 123A, 123B. In further embodiments, an energy supply characteristic object 125, 125A, 125B, may be used for offsetting matching carbon emissions by utilizing system stress data point objects 121, 121A, 121B, taken over a relatively small time period, such as sub-hourly, hourly, two hour, or other time period that is below a daily or 24 hour time period. In this manner, energy supply characteristic object 125, 125A, 125B, may be used for providing true greenhouse gas emission offset, for example, by offsetting daytime usage with daytime availability versus offsetting nighttime usage with daytime solar generation.

In further embodiments, an energy supply characteristic object 125, 125A, 125B, may comprise data describing the amount of supply and demand imbalance in the power supply of a node 111, 112, of aggregate of two or more nodes 111, 112, or of the network or power grid 110 as a whole based on one or more differential objects 123, 123A, 123B, (preferably over a time period described by the time stamp objects 122, 122A, 122B) and one or more weather data objects 124, 124A, 124B, at a time or over a time period corresponding to the time stamp objects 122, 122A, 122B, of the two or more system stress data point objects 121, 121A, 121B, used to generate the one or more differential objects 123, 123A, 123B. For example, the energy supply characteristic object 125, 125A, 125B, for a relatively smaller differential object 123, 123A, 123B, generated from two or more system stress data point objects 121, 121A, 121B, and one or more corresponding weather data objects 124, 124A, 124B, for a particular node 111, 112, may comprise data describing that the particular node 111, 112, has a relatively smaller ability for offsetting carbon emissions based adverse weather events and conditions resulting in larger differential 123, 123A, 123B, for that node 111, 112.

In preferred embodiments, a system database 120 may comprise one or more, such as a plurality of, differential threshold objects, such as a first differential threshold object 126, a second differential threshold object 126A, a third differential threshold object 126B, etc. Generally, a differential threshold object 126, 126A, 126B, may comprise a value that a particular differential object 123, 123A, 123B, is to be compared to in order for the system 100 to determine an energy supply characteristic object 125, 125A, 125B. For example, an energy supply characteristic object 125, 125A, 125B, of one or more generator nodes 111, 112, may be determined by comparing a differential object 123, 123A, 123B, to a differential threshold 126, 126A, 126B, and generating the energy supply characteristic object 125, 125A, 125B, based on whether the differential object 123, 123A, 123B, is below, meets, or exceeds the differential threshold 126, 126A, 126B.

The system 100 may comprise one or more communication engines 131. A communication engine 131 may comprise or function as communication logic stored in a memory 310, 410, which may be executable by a processor 302, 402, of a server 300, client device 400, and/or any other type of computing platform. In some embodiments, a communication engine 131 may be configured to query and/or receive data inputs from one or more power grids 110, generator nodes 111, 112, terrestrial weather sensors 113, and/or non-terrestrial weather sensors 114, and use those inputs to instantiate one or more system stress data point objects 121, 121A, 121B, time stamp objects 122, 122A, 122B, and weather data objects 124, 124A, 124B, in a system database 120 that contain data of those inputs.

In some embodiments, a communication engine 131 may be configured to query and/or receive data inputs (preferably hourly or finer granularity, such as sub-hourly, although longer periods may be used) from one or more power grids 110 and/or generator nodes 111, 112, to instantiate one or more system stress data point objects 121, 121A, 121B, and time stamp objects 122, 122A, 122B, in which the inputs may include: inputs for supply/demand imbalance or system stress; nodal/aggregate geographic locations, nodal/aggregate network locations, nodal prices, aggregate prices, power flows, nodal supply, nodal supply type (wind, solar, natural gas, etc.) nodal load, system generation resource mix (how much solar, how much wind, etc.), hourly or sub-hourly system capacity, hourly or sub-hourly system residual capacity. Load forecasts, generation forecasts, and other inputs may be retrieved by the communication engine 131 at an hourly, sub-hourly, daily, weekly, monthly cycle, etc., as real-time ingestion of data is not required.

In some embodiments, a communication engine 131 may be configured to query and/or receive data inputs (preferably hourly or finer granularity, such as sub-hourly, although longer periods may be used) from one or more terrestrial weather sensors 113, non-terrestrial weather sensors 114, power grids 110 and/or generator nodes 111, 112, to instantiate one or more weather data objects 124, 124A, 124B, in which the inputs may include: latitude, longitude, cloud cover, thickness and level, visibility, atmospheric transmittance/opacity, Global Horizontal Irradiance (GHI), Direct Normal Irradiance (DNI), Diffuse Horizontal Irradiance (DHI), other measures of solar light intensity, temperature, pressure, dew point, conditions (snow, rain, etc.), wind speed, wind direction, and weather forecasts. These inputs may be retrieved by the communication engine 131 on an hourly, sub-hourly, daily, weekly, monthly cycle, etc., as real-time ingestion of data is not required.

In some embodiments, a communication engine 131 may be configured to query and/or receive data inputs to instantiate one or more weather data objects 124, 124A, 124B, from one or more terrestrial weather sensors 113 that may include anemometers, ultrasonic wind sensors, solar cell sensors configured to determine solar light intensity (optionally Clear-Sky solar irradiance may be calculated using algorithms such as Bird, REST, sSOLIS, MRM5, SMARTS, etc.), temperature sensors, barometric pressure sensors, doppler radar sensors, and other non-orbiting weather sensors, which may be proximate to a node 111, 112, such as by being within a 0.25 mile radius of the node 111, 112. In further embodiments, a communication engine 131 may be configured to query and/or receive data inputs to instantiate one or more weather data objects 124, 124A, 124B, from one or more terrestrial weather sensors 113 that may include anemometers, ultrasonic wind sensors, solar cell sensors configured to determine solar light intensity, temperature sensors, barometric pressure sensors, doppler radar sensors, and other non-orbiting weather sensors, which may be remote from a node 111, 112, such as by being outside of a 0.25 mile radius of the node 111, 112, e.g., aviation reports (METAR and ACARS), local weather stations, etc. In further embodiments, a communication engine 131 may be configured to query and/or receive data inputs to instantiate one or more weather data objects 124, 124A, 124B, from one or more non-terrestrial weather sensors 114, e.g., satellite-based weather sensors.

The system 100 may comprise one or more generation engines 132. A generation engine 132 may comprise or function as generation logic stored in a memory 310, 410, which may be executable by the processor 302, 402, of a server 300, client device 400, and/or any other type of computing platform. In some embodiments, a generation engine 132 may be configured to use one or more differential threshold objects 126, 126A, 126B, system stress data point objects 121, 121A, 121B, and their time stamp objects 122, 122A, 122B, to generate one or more differential objects 123, 123A, 123B, and energy supply characteristic objects 125, 125A, 125B, and to instantiate the differential objects 123, 123A, 123B, and energy supply characteristic objects 125, 125A, 125B, in a system database 120. In further embodiments, a generation engine 132 may be configured to use one or more system stress data point objects 121, 121A, 121B, and their time stamp objects 122, 122A, 122B, along with one or more weather data objects 124, 124A, 124B, to generate one or more differential objects 123, 123A, 123B, and energy supply characteristic objects 125, 125A, 125B, and to instantiate the differential objects 123, 123A, 123B, and energy supply characteristic objects 125, 125A, 125B, in a system database 120.

Preferably, the generation engine 132 may determine an energy supply characteristic object 125 by comparing a differential object 123 to a differential threshold 126, and generating the energy supply characteristic object 125 based on whether the differential object 123 is below, meets, or exceeds the differential threshold 126. A differential threshold object 126, 126A, 126B, may comprise a threshold value that is specific to the differential object 123, 123A, 123B, that it is to be compared to. For example, if a differential object 123, 123A, 123B, describes a differential in value of power paid to the generator node 111, 112, at two different time periods, then the differential object 123, 123A, 123B, would be compared to a differential threshold object 126, 126A, 126B, that is a value of power paid threshold value in order to determine an energy supply characteristic object 125, 125A, 125B. As another example, if a differential object 123, 123A, 123B, describes a residual capacity of a generator node 111, 112, at two different time periods, then the differential object 123, 123A, 123B, would be compared to a differential threshold object 126, 126A, 126B, that is a residual capacity threshold value in order to determine an energy supply characteristic object 125, 125A, 125B. As a further example, if a differential object 123, 123A, 123B, describes a power generation amount generated by a generator node 111, 112, at two different time periods, then the differential object 123, 123A, 123B, would be compared to a differential threshold object 126, 126A, 126B, that is a power generation amount threshold value in order to determine an energy supply characteristic object 125, 125A, 125B.

Figure 7:
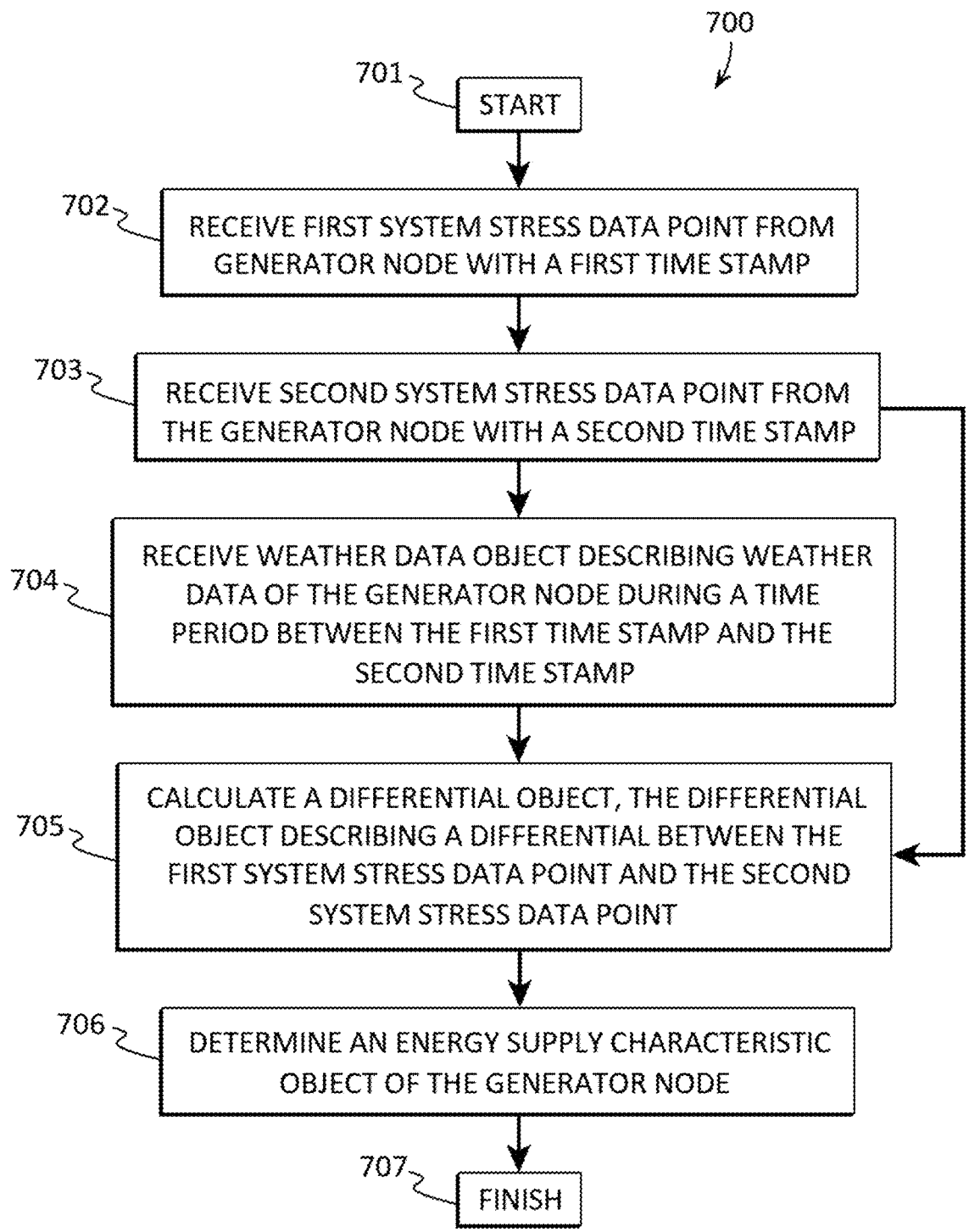
FIG. 7 depicts a block diagram illustrating an example of a block diagram of an example of a computer-implemented method for quantifying infrastructure impacts to electricity grid greenhouse gas emissions according to various embodiments described herein.

FIG. 7 shows a block diagram of an example of a computer-implemented method for quantifying infrastructure impacts to electricity grid greenhouse gas emissions ("the method") 700 according to various embodiments described herein. In some embodiments, the method 700 may be used to determine one or more energy supply characteristic objects 125, 125A, 125B, of a planned or existing generator node 111, 112, or any number of planned or existing generator nodes 111, 112, of a power grid 110 using one or more system stress data point objects 121, 121A, 121B, and for providing the true offset of carbon emissions as opposed to existing methods in which offset can occur at any time, e.g., daytime generation is offset with nighttime generation, and current offset is provided at a daily/monthly/yearly level. In preferred embodiments, the method 700 may utilize one or more weather data objects 124, 124A, 124B, which may be used to determine one or more energy supply characteristic objects 125, 125A, 125B, via one or more system stress data point objects 121, 121A, 121B, in which the one or more energy supply characteristic objects 125, 125A, 125B correlate system stress of a power grid 110 to weather events, (expected or unexpected) to infer dependance of system stress events on weather conditions. One or more steps of the method 700 may be performed by a communication engine 131 and/or a generation engine 132 which may be executed by a computing device processor, such as a processor 302 (FIG. 2) and/or a processor 402 (FIG. 3) of a computing platform.

The method 700 may start 701 and a first system stress data point 121A may be received by a communication engine 131 from a generator node 111, 112, with a first time stamp 122A in step 702. In some embodiments, a first system stress data point 121A may be received from the generator node 111, 112, from a power grid 110 that the node 111, 112, is in communication with, or any other source which publishes or otherwise makes system stress data 121, 121A, 121B, available. In preferred embodiments, a communication engine 131 running on processor 302, 402, of a computing platform, such as a server 300 or a client device 400, may instantiate the first system stress data point 121A with the first time stamp 122A in a system database 120.

In step 703, a second system stress data point 121B may be received by a communication engine 131 from the generator node 111, 112, with a second time stamp 122B. In some embodiments, a second system stress data point 121B may be received from the generator node 111, 112, from a power grid 110 that the node 111, 112, is in communication with, or any other source which publishes or otherwise makes system stress data 121, 121A, 121B, available. In preferred embodiments, the communication engine 131 may instantiate the second system stress data point 121B with the second time stamp 122B in the system database 120.

In some embodiments of steps 702 and 703, the first system stress data point 121A may comprise a first value of power paid to the generator node 111, 112, at the first time stamp 122A, and the second system stress data point 121B may comprise a second value of power paid to the generator node 111, 112, at the second time stamp 122B. Value of power may comprise the price or other economic measure of planned or agreed upon rate that is paid to a generator node 111, 112, for the power that it provides to the power grid 110. Value of power may include multiple value streams), and can include price spikes (up or down), price volatility changes, increased frequency, increased magnitude of price, etc.

In some embodiments of steps 702 and 703, the first system stress data point 121A may comprise a first residual capacity at the first time stamp 122A, and the second system stress data point 121B may comprise a second residual capacity at the second time stamp 122B. In some embodiments, residual capacity may describe: the residual capacity data of the generator node 111, 112, of steps 702 and 703; the residual capacity data of the power grid 110, that the generator node 111, 112, is in communication with; the residual capacity data of one or more other generator nodes 111, 112, such as by power generation type (e.g., wind, solar, coal, nuclear, etc.) of the power grid 110; and/or the residual capacity data of the generator node 111, 112, and one or more other generator nodes 111, 112, of the power grid 110 that are the same type as the generator node 111, 112, of steps 702 and 703.

In some embodiments of steps 702 and 703, the first system stress data point 121A may comprise a first power generation amount generated by the generator node 111, 112, at the first time stamp 122A, and the second system stress data point may comprise 121B a second power generation amount generated by the generator node 111, 112, at the second time stamp 122B. In some embodiments, power generation amount may describe: the amount of power generated by the generator node 111, 112, of steps 702 and 703; the amount of power generated by the power grid 110, that the generator node 111, 112, is in communication with; the amount of power generated by one or more other generator nodes 111, 112, such as by power generation type (e.g., wind, solar, coal, nuclear, etc.) of the power grid 110; and/or the amount of power generated by the generator node 111, 112, and one or more other generator nodes 111, 112, of the power grid 110 that are the same type as the generator node 111, 112, of steps 702 and 703.

In optional step 704, a weather data object 124 describing weather data of the generator node 111, 112, during a time period between the first time stamp 122A and the second time stamp 122B may be received by the communication engine 131. In some embodiments, a weather data object 124 may be satellite or corrected data based on other inputs. In preferred embodiments, the communication engine 131 may instantiate the weather data object 124 in the system database 120. In some embodiments, a communication engine 131 may be configured to query and/or receive data inputs (preferably hourly or finer granularity, such as sub-hourly, although longer periods may be used) from one or more terrestrial weather sensors 113, non-terrestrial weather sensors 114, power grids 110 and/or generator nodes 111, 112, to instantiate one or more weather data objects 124, 124A, 124B, in which the inputs may include: latitude, longitude, cloud cover, thickness and level, visibility, atmospheric transmittance/opacity, Global Horizontal Irradiance (GHI), Direct Normal Irradiance (DNI), Diffuse Horizontal Irradiance (DHI), other measures of solar light intensity, temperature, pressure, dew point, conditions (snow, rain, etc.), wind speed, wind direction, and weather forecasts. These inputs may be retrieved by the communication engine 131 on an hourly, sub-hourly, daily, weekly, monthly cycle, etc., as real-time ingestion of data is not required.

In some embodiments of step 704, a communication engine 131 may be configured to query and/or receive data inputs to instantiate one or more weather data objects 124, 124A, 124B, from one or more terrestrial weather sensors 113 that may include anemometers, ultrasonic wind sensors, solar cell sensors configured to determine solar light intensity (optionally Clear-Sky solar irradiance may be calculated using algorithms such as Bird, REST, sSOLIS, MRM5, SMARTS, etc.), temperature sensors, barometric pressure sensors, doppler radar sensors, and other non-orbiting weather sensors, which may be proximate to a node 111, 112, such as by being within a 0.25 mile radius of the node 111, 112. In further embodiments, a communication engine 131 may be configured to query and/or receive data inputs to instantiate one or more weather data objects 124, 124A, 124B, from one or more terrestrial weather sensors 113 that may include anemometers, ultrasonic wind sensors, solar cell sensors configured to determine solar light intensity, temperature sensors, barometric pressure sensors, doppler radar sensors, and other non-orbiting weather sensors, which may be remote from a node 111, 112, such as by being outside of a 0.25 mile radius of the node 111, 112, e.g., aviation reports (METAR and ACARS), local weather stations, etc. In further embodiments, a communication engine 131 may be configured to query and/or receive data inputs to instantiate one or more weather data objects 124, 124A, 124B, from one or more non-terrestrial weather sensors 114, e.g., satellite-based weather sensors.

In preferred embodiments of step 704, the weather data object 124 may comprise at least one of wind speed and solar light intensity at the generator node 111, 112, during a time period between the first time stamp 122A and the second time stamp 122B, in which the wind speed and solar light intensity are measured at the altitude at which one or more wind turbines and solar panels are or would be disposed. In further embodiments, the weather data object 124 may comprise wind speed measured via a terrestrial weather sensor 114 that may be an anemometer, an ultrasonic wind sensor, or any other sensor for measuring wind speed. In further embodiments, the weather data object 124 may comprise wind speed at the generator node 111, 112, during a time period between the first time stamp 122A and the second time stamp 122B, and the weather data object 124 may be obtained from a weather information provider that is remote from the generator node 111, 112. In further embodiments, the weather data object 124 may comprise solar light intensity obtained by determining the solar irradiance experienced by the generator node 111, 112. In further embodiments, the weather data object 124 may comprise solar light intensity at the generator node 111, 112, during a time period between the first time stamp 122A and the second time stamp 122B, and the weather data object 124 may be obtained from a weather information provider that is remote from the generator node 111, 112.

It should be understood that steps 702, 703, and optional step 704 may be performed in any order, including being performed simultaneously, and that steps 705 and 706 may be performed on system stress data points 121A, 121B, and, preferably on one or more weather data objects 124, when they are received by the system 100 or at any time thereafter.

In step 705, a differential object 123 may be calculated by a generation engine 132 in which the differential object 123 describes a differential between the first system stress data point 121A and the second system stress data point 121B. In preferred embodiments, the generation engine 132 may instantiate the differential object 123 in the system database 120.

As an example, for a single node or collection of nodes (aggregate), for each time span (hourly, sub hourly, or other time period) step 705 may comprise obtaining through measurement or through calculated inference, an electricity supply/demand imbalance score SDIS in which more supply than needed is generally called residual capacity. Preferably, the SDIS (supply demand imbalance score) may range from 0-100 where 50 is balanced, lower is decreased supply and higher is increased supply (compared to demand). In some embodiments, step 705 may be performed using system stress data point objects 121A, 121B, that comprise electricity data from ISO/meters/measuring devices which may be used to generate the SDIS. In further embodiments, and in the absence of measured electricity data, system stress data point objects 121A, 121B, may comprise available data such as prices and price fluctuations to infer residual demand and generate SDIS. Deviation from expected is comparison of actual to the "expected". Expected may be based on an average for that time of day/time of year or may be deviation from a forecast, such as a 1, 2, 3, 4, 5 day, or other time period forecast. The generation engine 132 may start with score of 50, and the magnitude of the increases and decreases below may be generalized as: X*log ((distance from average or expected)/Y). The following examples may be calculated and/or be from a forecast:

if price<average or expected (system stress data point objects 121A, 121B, comprise value of power paid to the generator node 111, 112), increase SDIS (increase differential object 123);

if price>average or expected (system stress data point objects 121A, 121B, comprise value of power paid to the generator node 111, 112), decrease SDIS (decrease differential object 123);

if price variations (over a time interval) are more frequent than average or expected (system stress data point objects 121A, 121B, comprise value of power paid to the generator node 111, 112), decrease SDIS (decrease differential object 123);

if nodal or system load is <average or expected (system stress data point objects 121A, 121B, comprise power generation amount by the generator node 111, 112, or by two or more nodes 111, 112), increase SDIS (increase differential object 123); and if nodal or system load is >average or expected (system stress data point objects 121A, 121B, comprise power generation amount by the generator node 111, 112, or by two or more nodes 111, 112), decrease SDIS (decrease differential object 123).

In step 706, an energy supply characteristic object 125 of the generator node 111, 112, may be determined by the generation engine 132 based on the differential object 123 between the first system stress data point 121A and the second system stress data point 121B. In preferred embodiments, the generation engine 132 may instantiate the energy supply characteristic object 125 in the system database 120. Preferably, the generation engine 132 may determine the energy supply characteristic object 125 of the generator node 111, 112, by comparing the differential object 123 to a differential threshold 126, and generating the energy supply characteristic object 125 based on whether the differential object 123 is below, meets, or exceeds the differential threshold 126. For example, the generation engine 132 may determine the energy supply characteristic object 125 of the generator node 111, 112, to have a relatively greater carbon offset ability if the differential object 123 between the first system stress data point 121A and the second system stress data point 121B does not exceed the differential threshold 126, and determining the energy supply characteristic object 125 of the generator node 111, 112, to have a relatively lesser carbon offset ability if the differential object 123 between the first system stress data point 121A and the second system stress data point 121B exceeds the differential threshold 126.

Continuing the above example, using the SDIS score, the differential threshold 126 may be a score of 50, with the magnitude of the increases and decreases below are generalized as: X*log ((distance from average or expected)/Y).

The following examples may be calculated and/or be from a forecast:

if price<average or expected (system stress data point objects 121A, 121B, comprise value of power paid to the generator node 111, 112), increase SDIS (increase differential object 123) and the energy supply characteristic object 125 may be determined to be more supply than demand;

if price>average or expected (system stress data point objects 121A, 121B, comprise value of power paid to the generator node 111, 112), decrease SDIS (decrease differential object 123) and the energy supply characteristic object 125 may be determined to be less supply than demand;

if price variations (over a time interval) are more frequent than average or expected (system stress data point objects 121A, 121B, comprise value of power paid to the generator node 111, 112), decrease SDIS (decrease differential object 123) and the energy supply characteristic object 125 may be determined to be less supply than demand;

if nodal or system load is <average or expected (system stress data point objects 121A, 121B, comprise power generation amount by the generator node 111, 112, or by two or more nodes 111, 112), increase SDIS (increase differential object 123) and the energy supply characteristic object 125 may be determined to be more supply than demand; and if nodal or system load is >average or expected (system stress data point objects 121A, 121B, comprise power generation amount by the generator node 111, 112, or by two or more nodes 111, 112), decrease SDIS (decrease differential object 123) and the energy supply characteristic object 125 may be determined to be less supply than demand.

In further embodiments of step 706, determining an energy supply characteristic object 125 of the generator node 111, 112, may be determined by the generation engine 132 based on a weather data object 124 and the differential object 123 between the first system stress data point 121A and the second system stress data point 121B, in which the energy supply characteristic object 125 of the generator node 111, 112, is determined to have a relatively greater carbon offset ability if the differential object 123 between the first system stress data point 121A and the second system stress data point 121B does not exceed a differential threshold 126, the energy supply characteristic object 125 of the generator node 111, 112, is determined to have a relatively lesser carbon offset ability if the differential object between the first system stress data point 121A and the second system stress data point 121B exceeds the differential threshold 126.

As an example, and ignoring times of unusual required load, for a weather-based generation node 111, such as a wind turbine generation facilities 111A and solar generation facilities 111B, the system 100 may calculate a supply demand energy supply characteristic object 125 that describes a "potential carbon offset score" of node 111 that is already influenced by weather/renewable generation, e.g., if value of power, such as prices, move related to weather events (prices at node 111, 112, go up/down when wind is low, for solar cloudy, or night) and/or if price characteristic change related to weather (e.g., prices become more/less variable when wind goes up). If no impact based on weather events, then the system 100 may determine that the energy supply characteristic object 125 of the node 111, 112, does not have weather correlation and is likely to have greater carbon offset ability (high carbon offset score). If impact based on weather events, then the system 100 may determine that the energy supply characteristic object 125 of the node 111, 112, does have weather correlation and is likely to have lesser carbon offset ability (low carbon offset score). Similarly, the method 700 may also be configured to create similar carbon offset score for an entire power grid 110 or aggregations of two or more nodes (hubs or zones) 111, 112.

In further embodiments, the method 700 may use relation between nodal potential carbon offset score and the grid 110/aggregated node 111, 112, carbon offset score to convert the nodal potential carbon offset score to a percentage of hourly, sub-hourly, or other time period, carbon offset for new generation asset. In further embodiments, the method 700 may apply trends in weather, load, and renewable generation (including events) to calculate future offset amounts and duration.

After step 706, the method 700 may finish 707.

In further embodiments, the method 700 may use power grid 110 system level generation mix to create a System Generation Type SDIS. The system generation supply demand imbalance score is a way to compare the SDIS to generation type specific components of the overall SDIS. For example, wind SDIS score would be N/A if there were no wind generation at the time of the SDIS score, if wind was 100% then the wind System Generation Type SDIS would=the SDIS. Otherwise, the wind percentage of total generation would be applied to the SDIS to weight it away from 50 (make it lower than 50).

In further embodiments, the method 700 may be used to create a Localized Generation Type Score (LGTS). For example, the method 700 may measure or calculate hourly or sub hourly wind/or solar generation at a given location (or aggregate of locations). If actual generation cannot be measured (either because generator node 111, 112, is planned, then expected generation may be estimated, such as estimating generation from measured weather data and equipment generation formulas for the type and size of generator node 111, 112. The method 700 may use localized wind or solar generation data (measured or calculated) at the location to create LGTS (localized generation type) score (100–max generation for that type and configuration, 0 no generation).

In further embodiments, for each hour, sub hour, or other time period, LGTS and SDIS may be combined to enable the method 700 to determine an energy supply characteristic object 125 that describes the sensitivity for each local generator 111, 112, to the SDIS. For example, the method 700 may create localized generator stress impact score (LGSIS), such as on a scale of 0 to 100, low/med/high, etc. The following examples described below are relative to each other and number ranges are not defined:

LGTS High when SDIS is low results in a High LGSIS-High local generation and low amount of system supply translates to a high LGSIS (energy supply characteristic object 125) meaning that this generator 111, 112, has a high impact because it is generating when supply is needed.

LGTS High when SDIS is high results in a Low LGSIS-High local generation and high amount of system grid 110 supply translates to a low LGSIS (energy supply characteristic object 125) meaning that this generator 111, 112, has a low impact because it is generating when supply is not needed LGTS low (not zero) when SDIS is low results in a Medium LGSIS-Low local generation and low amount of system supply translates to a medium LGSIS (energy supply characteristic object 125) meaning that this generator has a medium impact because it is generating when supply is needed.

LGTS zero when SDIS is low results in a low LGSIS-Zero local generation and low amount of system supply translates to a low LGSIS (energy supply characteristic object 125) meaning that this generator 111, 112, has a low impact because it is not generating when supply is needed.

LGTS is low (or zero) and SDIS high results in low LGSIS-Low or zero local generation and high amount of system supply translates to a low LGSIS (energy supply characteristic object 125) meaning that this generator 111, 112, has a low impact because it is generating or not when supply is not needed.

At this point there is a nodal or aggregate representation of the sensitivity of supply demand to a particular renewable generation node 111 (planned or existing). At present most people would say that adding new renewable generation node 111 at a location with a high supply/demand sensitivity at that point would mean that there would be carbon offset like the amount generation of the new generation. This overlooks an important point. Adding new renewable energy nodes 111, even if with high correlation to when supply is needed (high sensitivity), runs the risk of making traditional fossil fired generation nodes 112 uneconomical. This is a problem if the fossil or non-renewable energy power generator node 112 is still required to support system reliability of the power grid 110, e.g., sun does not shine at night and the wind does not always blow. By displacing a non-renewable energy power generator node 112 generation during a few hours (possibly high value hours) that leaves less hours of the day/year for the non-renewable energy power generator node 112 to be economical which could force the non-renewable energy power generator node 112 generator to have to close. The result of which is lack of supply in the power grid 110 at times when renewable generation is not present.

To solve for this problem, when adding renewable energy power generator nodes 111 it is needed to provide a subsidy for non-renewable energy power generator nodes 112 to make them economical in order to enable the power grid 110 to provide a consistent block of power via 24 hour a day power generation.

If a power grid 110 cannot provide non-intermittent/dispatchable power, then it needs a way to account for financial support to one or more non-renewable energy power generator nodes 112 to make them economical so that the power grid 110 remains solvent. This may be referred to as a non-renewable support cost or a Fossil Subsidy.

It is required to have an hourly, sub-hourly, or other time period carbon offset score (LGTS described above) to build on to generate a scoring system for potential carbon offset that includes a requirement that power be available when it is needed, not only when the renewable energy power generator nodes 111 (wind, sun, etc.) are available.

In preferred embodiments, the system 100 and method 700 may be used to calculate non-renewable support cost (subsidy)

First, a generator subsidy threshold may be calculated. For a defined time-granularity (day, month, year, etc.) calculate one half of the hourly average generation for the asset node 111, 112, or class of asset nodes 111, 112. For example, if a wind asset generated an average of 240 megawatt hours per day, then the threshold would be 5 megawatts per hour.

Next, a generator hourly Subsidy Quantity may be calculated. Every hour that the generator node 111, 112, is generating less than the calculated threshold increases the needed subsidy quantity. For each hour the quantity can be calculated by: $(LGTS/400)+0.6)*(hourly\ system\ demand)$. This sample formula meets the requirements of: subsidy needed to be weighted by the impact that the asset has on supply demand (LGTS); and subsidy needed is related to ensuring non-renewable energy power generator node(s) 112 could provide 100% power for that hour if needed.

Finally, the non-renewable support cost or Fossil Subsidy for one or more non-renewable energy power generator nodes 112 may be calculated. This may include converting hourly Subsidy Quantity to a dollar amount, which provides a way to normalize the score so that it can be combined to other evaluations. Subsidy Quantity*blended heat rate for the non-renewable assets*blended fuel cost for the non-renewable assets.

The Subsidy Amount can now be used for portfolio optimization. If it is desired to optimize a generator node 111, 112, portfolios based on true carbon offset at the hourly or sub-hourly level (e.g., offsetting daytime usage with daytime availability), the portfolios may be ranked based solely on Subsidy Amount. If a more wholistic approach is desired, the Subsidy Amount (will be negative) may be added to the revenue of the project, to have a carbon risk adjusted revenue metric to optimize.

It will be appreciated that some exemplary embodiments described herein may include one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the two approaches may be used. Moreover, some exemplary embodiments may be implemented as a computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), a Flash memory, and the like.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine-readable storage device, a machine-readable storage substrate, a memory device, a composition of matter effecting a machine-readable propagated signal, or a combination of one or more of them.

A computer program (also known as a program, software, software application, application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors (computing device processors) executing one or more computer applications or programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, solid state drives, or optical disks. However, a computer need not have such devices.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), light emitting diode (LED) display, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network or the cloud. The relationship of client and server arises by virtue of computer programs running on the respective computers and having a client server relationship to each other.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The computer system may also include a main memory, such as a random-access memory (RAM) or other dynamic storage device (e.g., dynamic RAM (DRAM), static RAM (SRAM), and synchronous DRAM (SDRAM)), coupled to the bus for storing information and instructions to be executed by processor. In addition, the main memory may be used for storing temporary variables or other intermediate information during the execution of instructions by the processor. The computer system may further include a read only memory (ROM) or other static storage device (e.g., programmable ROM (PROM), erasable PROM (EPROM), and electrically erasable PROM (EEPROM)) coupled to the bus for storing static information and instructions for the processor.

The computer system may also include a disk controller coupled to the bus to control one or more storage devices for storing information and instructions, such as a magnetic hard disk, and a removable media drive (e.g., floppy disk drive, read-only compact disc drive, read/write compact disc drive, compact disc jukebox, tape drive, and removable magneto-optical drive). The storage devices may be added to the computer system using an appropriate device interface (e.g., small computer system interface (SCSI), integrated device electronics (IDE), enhanced-IDE (E-IDE), direct memory access (DMA), or ultra-DMA).

The computer system may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system may also include a display controller coupled to the bus to control a display, such as a cathode ray tube (CRT), liquid crystal display (LCD), light emitting diode (LED) display, or any other type of display, for displaying information to a computer user. The computer system may also include input devices, such as a keyboard and a pointing device, for interacting with a computer user and providing information to the processor. Additionally, a touch screen could be employed in conjunction with display. The pointing device, for example, may be a mouse, a trackball, or a pointing stick for communicating direction information and command selections to the processor and for controlling cursor movement on the display. In addition, a printer may provide printed listings of data stored and/or generated by the computer system.

The computer system performs a portion or all of the processing steps of the invention in response to the processor executing one or more sequences of one or more instructions contained in a memory, such as the main memory. Such instructions may be read into the main memory from another computer readable medium, such as a hard disk or a removable media drive. One or more processors in a multi-processing arrangement may also be employed to execute the sequences of instructions contained in main memory. In alternative embodiments, hard-wired circuitry may be used in place of or in combination with software instructions. Thus, embodiments are not limited to any specific combination of hardware circuitry and software.

As stated above, the computer system includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system, for driving a device or devices for implementing the invention, and for enabling the computer system to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code or software code of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

Various forms of computer readable media may be involved in carrying out one or more sequences of one or more instructions to processor for execution. For example, the instructions may initially be carried on a magnetic disk of a remote computer. The remote computer can load the instructions for implementing all or a portion of the present invention remotely into a dynamic memory and send the instructions over the air (e.g., through a wireless cellular network or WIFI network). A modem local to the computer system may receive the data over the air and use an infrared transmitter to convert the data to an infrared signal. An infrared detector coupled to the bus can receive the data carried in the infrared signal and place the data on the bus. The bus carries the data to the main memory, from which the processor retrieves and executes the instructions. The instructions received by the main memory may optionally be stored on storage device either before or after execution by processor.

The computer system also includes a communication interface coupled to the bus. The communication interface provides a two-way data communication coupling to a network link that is connected to, for example, a local area network (LAN), or to another communications network such as the Internet. For example, the communication interface may be a network interface card to attach to any packet switched LAN. As another example, the communication interface may be an asymmetrical digital subscriber line (ADSL) card, an integrated services digital network (ISDN) card or a modem to provide a data communication connection to a corresponding type of communications line. Wireless links may also be implemented. In any such implementation, the communication interface sends and receives electrical, electromagnetic or optical signals that carry digital data streams representing various types of information.

The network link typically provides data communication to the cloud through one or more networks to other data devices. For example, the network link may provide a connection to another computer or remotely located presentation device through a local network (e.g., a LAN) or through equipment operated by a service provider, which provides communication services through a communications network. In preferred embodiments, the local network and the communications network preferably use electrical, electromagnetic, or optical signals that carry digital data streams. The signals through the various networks and the signals on the network link and through the communication interface, which carry the digital data to and from the computer system, are exemplary forms of carrier waves transporting the information. The computer system can transmit and receive data, including program code, through the network(s) and, the network link and the communication interface. Moreover, the network link may provide a connection through a LAN to a client device or client device such as a personal digital assistant (PDA), laptop computer, tablet computer, smartphone, or cellular telephone. The LAN communications network and the other communications networks such as cellular wireless and Wi-Fi networks may use electrical, electromagnetic or optical signals that carry digital data streams. The processor system can transmit notifications and receive data, including program code, through the network(s), the network link and the communication interface.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A computer implemented method for quantifying infrastructure impacts to electricity grid greenhouse gas emissions, the method comprising;
    instantiating, via a processor of a computing platform, a first system stress data point from a generator node with a first time stamp in a database;
    instantiating, via the processor of the computing platform, a second system stress data point from the generator node with a second time stamp in the database;
    calculating, via the processor of the computing platform, a differential object, the differential object describing a differential between the first system stress data point and the second system stress data point; and
    determining, via the processor of the computing platform, an energy supply characteristic object of the generator node based on the differential between the first system stress data point and the second system stress data point.

2. The method of claim 1, further comprising one of: determining the energy supply characteristic object of the generator node to have a relatively greater carbon offset ability if the differential object between the first system stress data point and the second system stress data point does not exceed a differential threshold; and determining the energy supply characteristic object of the generator node to have a relatively lesser carbon offset ability if the differential object between the first system stress data point and the second system stress data point exceeds the differential threshold.

3. The method of claim 1, wherein the first system stress data point comprises a first value of power paid to the generator node at the first time stamp, and the second system stress data point comprises a second value of power paid to the generator node at the second time stamp.

4. The method of claim 1, wherein the first system stress data point comprises a first residual capacity at the first time stamp, and the second system stress data point comprises a second residual capacity at the second time stamp.

5. The method of claim 1, wherein the first system stress data point comprises a first power generation amount generated at the first time stamp, and the second system stress data point comprises a second power generation amount generated at the second time stamp.

6. The method of claim 1, further comprising receiving a weather data object describing weather data of the generator node during a time period between the first time stamp and the second time stamp, wherein the weather data object is used to determine the energy supply characteristic object of the generator node.

7. The method of claim 6, wherein the weather data object comprises at least one of wind speed and solar light intensity.

8. The method of claim 6, wherein the weather data object comprises wind speed measured via one of an anemometer and an ultrasonic wind sensor.

9. The method of claim 6, wherein the weather data object comprises wind speed at the generator node during a time period between the first time stamp and the second time stamp, and wherein the weather data object is obtained from a weather information provider that is remote from the generator node.

10. The method of claim 6, wherein the weather data object comprises solar light intensity obtained by determining the solar irradiance experienced by the generator node.

11. The method of claim 6, wherein the weather data object comprises solar light intensity at the generator node during a time period between the first time stamp and the second time stamp, and wherein the weather data object is obtained from a weather information provider that is remote from the generator node.

12. A computer implemented method for quantifying infrastructure impacts to electricity grid greenhouse gas emissions, the method comprising;

instantiating, via a processor of a computing platform, a first system stress data point from a generator node with a first time stamp in a database;

instantiating, via the processor of the computing platform, a second system stress data point from the generator node with a second time stamp in the database;

calculating, via the processor of the computing platform, a differential object, the differential object describing a differential between the first system stress data point and the second system stress data point;

instantiating, via the processor of the computing platform, a weather data object describing weather data of the generator node during a time period between the first time stamp and the second time stamp in the database; and determining, via the processor of the computing platform, an energy supply characteristic object of the generator node based on the weather data object and the differential object between the first system stress data point and the second system stress data point, wherein the energy supply characteristic object of the generator node is determined to have a relatively greater carbon offset ability if the differential object between the first system stress data point and the second system stress data point does not exceed a differential threshold, wherein the energy supply characteristic object of the generator node is determined to have a relatively lesser carbon offset ability if the differential object between the first system stress data point and the second system stress data point exceeds the differential threshold.

13. The method of claim 12, wherein the first system stress data point comprises a first value of power paid to the generator node at the first time stamp, and the second system stress data point comprises a second value of power paid to the generator node at the second time stamp.

14. The method of claim 12, wherein the first system stress data point comprises a first residual capacity at the first time stamp, and the second system stress data point comprises a second residual capacity at the second time stamp.

15. The method of claim 12, wherein the first system stress data point comprises a first power generation amount generated at the first time stamp, and the second system stress data point comprises a second power generation amount generated at the second time stamp.

16. The method of claim 12, wherein the weather data object comprises at least one of wind speed and solar light intensity.

17. The method of claim 12, wherein the weather data object comprises wind speed measured via one of an anemometer and an ultrasonic wind sensor.

18. The method of claim 12, wherein the weather data object comprises wind speed at the generator node during a time period between the first time stamp and the second time stamp, and wherein the weather data object is obtained from a weather information provider that is remote from the generator node.

19. The method of claim 12, wherein the weather data object comprises solar light intensity obtained by determining the solar irradiance experienced by the generator node.

20. The method of claim 12, wherein the weather data object comprises solar light intensity at the generator node during a time period between the first time stamp and the second time stamp, and wherein the weather data object is obtained from a weather information provider that is remote from the generator node.

\* \* \* \* \*